June 3, 1958
D. L. MORGAN
2,837,615
THERMOSTATIC CONTROL DEVICE
Filed Jan. 9, 1956
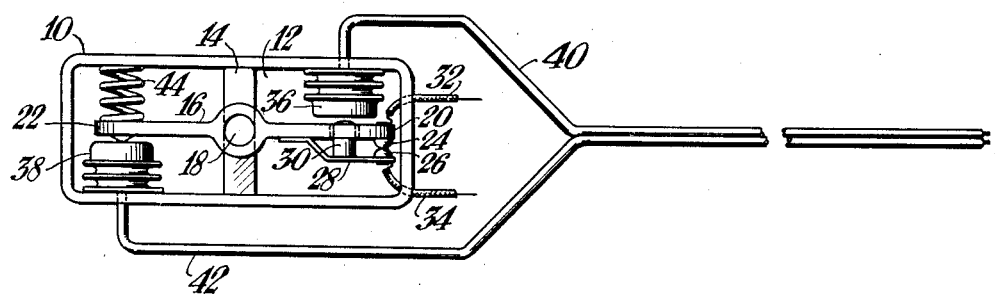
INVENTOR.
David L. Morgan.
BY
HIS ATTORNEY.

United States Patent Office 2,837,615
Patented June 3, 1958

2,837,615

THERMOSTATIC CONTROL DEVICE

David L. Morgan, Shelton, Conn., assignor to Robertshaw-Fulton Controls Company, Greensburg, Pa., a corporation of Delaware Application January 9, 1956, Serial No. 558,150

16 Claims. (Cl. 200—140)

This invention relates to thermostatic control devices and more particularly to thermostatic safety devices.

The invention has particular utility as a safety cut-out switch for detecting excess temperature conditions, it being understood however that the utility of the invention is not limited to such safety applications or to a switch as a controlling means. Therefore, explanation of the invention by reference to its use as a safety cut-out switch is by way of illustration and not of limitation.

In a safety cut-out device, it is desirable that the device be arranged to actuate a warning or corrective action when the temperature of the medium to be controlled or protected reaches a predetermined limit. In many applications it is highly desirable that such warning or corrective action occur exactly at the predetermined temperature limit to avoid needless shutting down of equipment or abnormal temperature conditions.

The most common source of error in present devices is the effect of ambient temperatures on the temperature responsive means. In an application such as an aircraft engine, the ambient temperatures affecting the temperature responsive means may vary over a wide range. Most customary ambient temperature compensating devices are only accurate within preselected temperature range and thus are generally inadequate for use on a safety cut-out device in such an application.

Another disadvantage of present devices is their response to only a single location. In an aircraft engine or a transformer there are a plurality of locations where fire or hot spots may occur. The customary methods of sensing or controlling these various locations have been to position a safety cut-out device in each location or to position one device centrally of the various locations. These methods are inadequate for the obvious reasons of high cost or poor sensitivity.

It is an object of this invention to compensate a safety cut-out device whereby the same will be substantially unaffected by ambient temperature conditions.

Another object of this invention is to incorporate in a safety cut-out device, a temperature responsive means which is responsive to the temperature condition of a plurality of locations and which is substantially unaffected by ambient temperature conditions.

In one preferred embodiment of the invention, switch means for controlling an electric circuit are carried by a rotatable lever. Temperature responsive means including a pair of expansible and contractible elements in communication with a pair of capillary tube sensing elements respectively are positioned in engagement with one end of said lever and the switch means respectively. Both expansible and contractible elements and their associated sensing elements are filled with volatile liquid which undergoes volumetric changes in response to a temperature change when in a liquid state, and a large volumetric change upon vaporization of the liquid at a predetermined control temperature. Biasing means are associated with one of said elements and are operative to pressure load the same whereby the vaporization temperature of said one element is increased, thereby effecting differential movements of said elements at the control temperature. Means are provided for actuating the switch means between controlling positions upon differential movement of said elements.

Other objects and advantages will become apparent from the following description taken in connection with the accompanying drawing which is a plan view of a control device embodying this invention.

Referring more particularly to the drawing, the control device includes a casing 10 defining a chamber 12. A main supporting bracket 14 is positioned within the chamber 12 and has the ends thereof fixed to oppositely disposed walls of the casing 10. A main control lever 16 is pivoted at a medial portion thereof on the support 14 by means of a shaft 18 mounted on the support 14, and defines a pair of lever arms 20 and 22.

Switch means are carried by the lever arm 20 and include a fixed contact 24 mounted on the end of the lever arm 20 and insulated therefrom. The contact 24 is cooperable with a movable contact 26 carried by one end of a flexible switch arm 28 which is attached to the lever arm 20 adjacent the shaft 18. A plunger 30 is fixed at one end to the switch arm 28 intermediate the ends thereof and has its other end extending through and slidably mounted in a bore in the lever arm 20.

The contact 26 is biased toward engagement with the contact 24 by the inherent bias of the switch arm 28. However, axial movement of the plunger 30 is operative to flex the switch arm 28 against said bias and open the contacts 24, 26. Two lead wires 32, 34 are connected to the contacts 24, 26 respectively and extend exteriorly of the casing 10 for connection in an electric circuit.

Temperature responsive means are provided for rotating the lever 16 and actuating the plunger 30. To this end, an expansible and contractible bellows member 36 is mounted at one end on one wall of the casing 10 and has the other movable end thereof engageable with the plunger 30. A second bellows member 38 is mounted at one end on the opposite wall of the casing 10 and has its movable end engaging the lever arm 22. Both bellows members 36, 38 are spaced equally from the shaft 18 for a purpose which will later become apparent.

A pair of capillary tube sensing elements 40, 42 are connected to the bellows members 36 and 38 respectively and extend exteriorly of the casing 10. The capillary tubes 40, 42 are preferably positioned in close proximity and adjacent to each other over a substantial portion of their length exterior of the casing 10 whereby both said capillary tubes will be equally affected by a temperature condition. The ends of both capillary tubes 40, 42 are sealed whereby each capillary tube defines a sealed system with its associated bellows member. Both said systems are filled with a suitable volatile liquid which undergoes volumetric changes when in a liquid state in response to temperature changes and a large volumetric change upon vaporization of the liquid at a predetermined temperature.

A spring 44 is mounted in compression between the lever arm 22 and the wall of the casing 10 in axial alignment with the bellows member 38 and is operative to bias the lever arm 22 into engagement with the bellows member 38. The spring 44 is preferably stronger than the inherent bias of the switch arm 28 and is of sufficient strength to pressure load the bellows members 38 to prevent vaporization of the liquid filling the bellows member 38 and its associated capillary tube 42.

*Operation*

For purposes of description, assume that the device is utilized as a safety cut-out switch for a large transformer (not shown) having a plurality of terminals. In this application, the contacts 24, 26 may be connected by means of lead wires 32, 34 to control energization of the transformer. The capillary tubes 40, 42 may be wound around each terminal of the transformer while maintaining the relative adjacent positioning thereof.

Should the temperature of any portion of the capillary tubes 40, 42 increase without exceeding the vaporization temperature of the liquid filling the same, both bellows members 36, 38 will move an equal amount. Movement of the bellows member 38 rotates the lever 16 clockwise against the bias of the spring 44 and since the bellows members 36, 38 move equally and are spaced at equal distance from the shaft 18, the bellows member 36 will follow movement of the lever 16 and plunger 30, maintaining the contacts 24, 26 in their normal closed position as shown.

Should the temperature of any portion of the capillary tubes 40, 42 increase above the normal vaporization temperature of the liquid filling their associated systems, vaporization of the liquid in that portion of capillary tube 40 will occur but be prevented in the adjacent portion of capillary tube 42 by the pressure loading of its associated system by spring 44. The bellows member 36 will now move a greater amount than the bellows member 38, and since the force of spring 44 is stronger than the inherent bias of the switch arm 28, the bellows member 36 will move the plunger 30 relative to the lever arm 20 and open the contacts 24, 26 thereby deenergizing the transformer.

Since it is only necessary that a small portion of the lengths of the capillary tubes 40, 42 be heated to the normal vaporization temperature of the liquid filling the same, the contacts 24, 26 will open upon any of the terminals of the transformer becoming shorted or for some reason heated. This action will take place regardless of the ambient temperatures of other portions of the capillary tubes 40, 42 since the bellows members 36, 38 move equal amounts in response to any temperature below the vaporization temperature.

Through proper selection of the volatile liquid, the device may be made responsive to any predetermined temperature and adapted to various applications. For example, the capillary tubes 40, 42 may be wound inside the housing of an aircraft engine and filled with a liquid which would vaporize at the fire temperature of the engine. Should any small portion of the capillary tubes 40, 42 reach a temperature that indicated fire, the contacts 24, 26 would open. This action would take place regardless of any combination of ambient temperatures as long as they were below the fire temperature.

Although only one embodiment of the invention has been herein shown and described, it will be apparent to those skilled in the art that the construction and arrangement of parts may be in other ways variously embodied or changed without departing from the scope of the invention as defined in the appended claims.

It is claimed and desired to secure by Letters Patent:

1. In a control device, the combination comprising thermally responsive means including a pair of expansible and contractible elements responsive to the same temperature conditions and movable in response to a change in said temperature condition, a volatile liquid in each of said elements, a control member movable between controlling positions, an operative connection between said control member and said elements, means including said operative connection for actuating said control member between said positions upon differential movements of said elements, and means associated with said elements for establishing different vaporization temperatures of the liquid in said elements thereby effecting differential movement of said members when the liquid in one of said elements vaporizes in response to a change in said temperature condition.

2. In a control device, the combination comprising thermally responsive means including a pair of expansible and contractible elements responsive to the same temperature condition and movable in response to a change in said temperature condition, a volatile liquid in each of said elements, a control member movable between controlling positions, an operative connection between said control member and said elements, means including said operative connection for actuating said control member between said positions upon differential movements of said elements, and biasing means associated with one of said elements operative to pressure load the same to increase the vaporization temperature of the fluid filling said one element thereby affecting differential movement of said members when the liquid in one of said elements vaporizes.

3. In a control device, the combination comprising thermally responsive means including a pair of expansible and contractible elements responsive to the same temperature condition and movable in response to a change in said temperature condition, a member operatively connected to said elements and movable between positions by movement of said elements, a control device carried by said member and including an element movable between controlling positions relative to said member, and yieldable means operative to actuate said control element between said positions upon differential movement of said expansible elements.

4. In a control device, the combination comprising thermally responsive means including a pair of expansible and contractible elements responsive to the same temperature condition and movable in response to a change in said temperature condition, a volatile liquid in each of said elements, a member operatively connected to said elements and movable therewith, a control device carried by said member and including an element movable between controlling positions relative to said member, and yieldable means operative to actuate said control element between said positions upon differential movement of said expansible and contractible elements, and biasing means operative to bias one of said expansible elements toward a contracted condition thereby increasing the vaporization temperature of the liquid in said one element to affect differential movement of said elements when the liquid in one of said elements vaporizes.

5. In a control device, the combination comprising means responsive to a temperature condition of the medium to be controlled including a member movable in response to temperature variations in said condition, second means responsive to said temperature condition and including a member movable in response to temperature variations in said condition, control means movable between controlling positions, means for actuating said control means between said positions upon unequal response of said members to a variation in said condition, and means associated with said members for causing equal response of said members to a first predetermined variation in said condition and unequal response of said members to a second predetermined variation in said condition.

6. In a control device, the combination comprising means responsive to a temperature condition the medium to be controlled including a member movable in response to temperature variations in said condition, second means responsive to said temperature condition and including a member movable in response to temperature variations in said condition, lever means operatively connected to both said members and rotatable in one direction by movement of said members, control means carried by said lever means and movable between controlling positions relative thereto, yieldable means associated with said lever means operatively connected to one of said members and means including said yieldable means for actuating said control means between said positions in response to differential movement of said members in response to a variation in said condition.

7. In a control device, the combination comprising first means responsive to a temperature condition of the medium to be controlled including an expansible and contractible member movable in response to temperature varations in said condition, second means responsive to said temperature condition including an expansible and contractible member movable in response to temperature variations in said condition, a volatile liquid filling said members, a centrally pivoted lever means having one end operatively connected to one of said members and the other end operatively connected to the other of said members and being rotatable in one direction by expansion of said members, control means carried by said lever means and movable between controlling positions relative thereto, yieldable means associated with said lever means for actuating said controlling means between said positions upon differential movement of said members, and biasing means associated with one of said members for pressure loading the same whereby the vaporization temperature of the liquid therein is increased thereby effecting differential movements of said members when the liquid filling the other said member vaporizes.

8. In a control device, the combination comprising thermally responsive means including a pair of expansible and contractible elements responsive to the same temperature condition and movable in response to variations in said temperature condition, a control member movable between controlling positions, an operative connection between said control member and said elements, means including said operative connection for actuating said control member between said positions upon differential movement of said elements, and means associated with one of said elements for effecting equal movements of said elements in response to a first predetermined variation in said temperature condition and differential movement of said elements in response to a second predetermined variation in said temperature condition.

9. In a control device, the combination comprising thermally responsive means including a pair of expansible and contractible elements responsive to the same temperature condition and movable in response to a change in said temperature condition, lever means operatively connected to both said elements and rotatable in one direction by expansion of said elements, controlling means carried by said lever means and movable between controlling positions relative thereto, and yieldable means associated with said lever means for actuating said controlling means between said controlling positions upon differential movement of said members.

10. In a control device, the combination comprising control means movable between controlling positions, temperature responsive means including a pair of expansible members, a pair of temperature sensing elements connected to said members respectively, said sensing elements being positioned in close proximity to each other for response to the same temperature condition, a volatile fluid filling each of said sensing elements and associated members, biasing means associated with one of said members operative to increase the vaporization temperature of fluid in one of said members and elements, and means for actuating said control means between said positions upon differential movement of said members in response to a change in the temperature condition.

11. A control device as claimed in claim 10 wherein said temperature sensing elements comprise a pair of parallel capillary tubes positioned in close proximity to each other.

12. A control device as claimed in claim 10 wherein said means for actuating said control means comprises a lever carrying said control means and operatively engaging said expansible members to be rotated in one direction by expansion of said elements, and a member carried by said lever and operatively connected to said control means, said member being moved relative to said lever by differential movement of said expansible members to actuate said control means.

13. In a control device, the combination comprising a pivotal lever, a pivot for said lever, a pair of switch contacts carried by said lever, one of said contacts being fixed to said lever and the other of said contacts being movable between open and closed positions relative to said fixed contact, a member carrying said movable contact and biased to normally maintain said contacts in one of said positions, a first movable member operatively engaging said lever for rotating the same on said pivot, a second movable member operatively engaging said contact carrying member, and biasing means operative to maintain engagement of said lever with said first movable member whereby said contact carrying member is actuated by differential movement of said movable members.

14. A control device as claimed in claim 13 wherein means responsive to a temperature condition are provided for actuating said movable members, said temperature responsive means including a pair of sensing elements connected to said movable members respectively and positioned in close proximity to each other.

15. A control device as claimed in claim 14 wherein said movable members are positioned on opposite sides of said lever and engage said lever and said contact carrying member respectively at points on opposite sides of said pivot and equidistant from said pivot.

16. A control device as claimed in claim 15 wherein said contact carrying member comprises a resilient spring arm biased by its inherent bias, and a plunger is slidably mounted in said lever having one end engaging said spring arm and the other end engaging said expansible member.

References Cited in the file of this patent

UNITED STATES PATENTS

| | | |
|---|---|---|
| 1,347,686 | Doman | July 27, 1920 |
| 1,492,844 | Hall | May 6, 1924 |
| 1,820,063 | Geiler | Aug. 25, 1931 |
| 2,216,589 | Grooms | Oct. 1, 1940 |
| 2,536,831 | Allan | Jan. 2, 1951 |
| 2,672,889 | Swanson | Mar. 23, 1954 |